(No Model.)
G. H. SALTSMAN.
CORN PLANTER AND FERTILIZER COMBINED.
No. 277,513. Patented May 15, 1883.
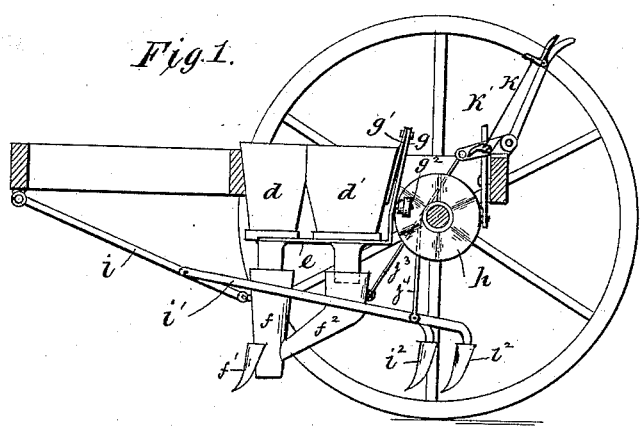
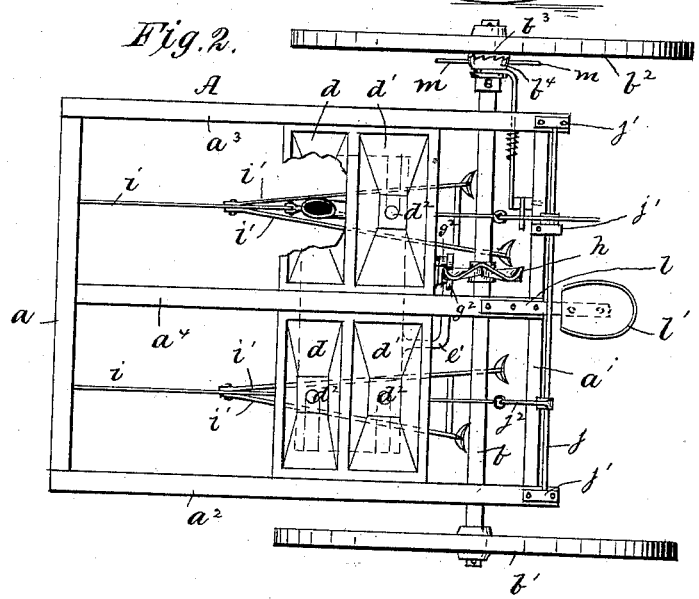
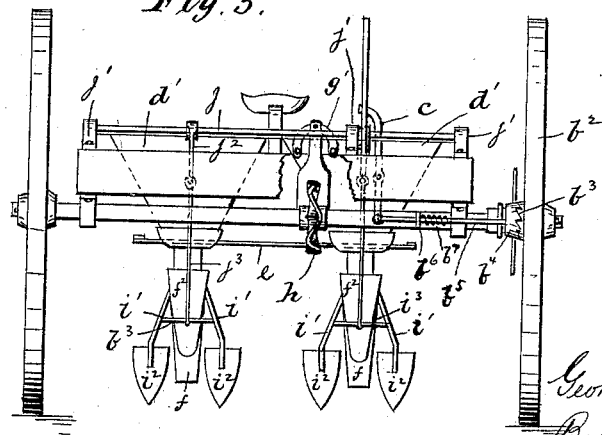
Witnesses:
P. B. Mupin
J. N. Griffin
Inventor:
George H. Saltsman
By R. S. & A. P. Lacey
Attys

UNITED STATES PATENT OFFICE.

GEORGE H. SALTSMAN, OF SALINEVILLE, OHIO.

CORN-PLANTER AND FERTILIZER COMBINED.

SPECIFICATION forming part of Letters Patent No. 277,513, dated May 15, 1883.

Application filed October 5, 1882. (No model.)

*To all whom it may concern:*

Be it known that I, GEORGE H. SALTSMAN, a citizen of the United States, residing at Salineville, in the county of Columbiana and State of Ohio, have invented certain new and useful Improvements in Corn-Planters and Fertilizers Combined; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention has relation to improvements in combined corn-planters and fertilizer-distributers; and it consists in the combination and arrangement of the several parts, as will be hereinafter fully described, and specifically pointed out in the claims.

In the drawings, Figure 1 is a vertical section, Fig. 2 is a plan view, and Fig. 3 is a rear elevation, of a machine constructed according to my invention.

A is the frame of my machine, composed of the front bar, $a$, the rear bar, $a'$, the side bars, $a^2 a^3$, and the intermediate bar, $a^4$, running parallel with bars $a^2 a^3$, as shown.

$b$ is the axle, journaled in bars $a^2 a^3 a^4$, and having the wheels $b' b^2$ spindled on its opposite ends, as shown.

$b^3$ is a clutch formed on the hub of wheel $b^2$, on the inner side of the wheel next the side bar $a^3$.

$b^4$ represents a clutch keyed to the axle, so that it may be slid into contact with the clutch $b^3$, or may be held free thereof by the mechanism hereinafter described.

$b^5$ is a rod connected to clutch $b^4$, and extended within the framing A.

$b^6$ is a lug secured on rod $b^5$.

$b^7$ is a coil-spring secured to side bar $a^3$ and lug $b^6$, and adapted to draw on lug $b^6$ and hold the clutch $b^4$ in contact with the lug $b^6$ when not drawn upon by the lever hereinafter described.

$c$ is a lever pivoted on the rear bar, $a'$, and having its lower arm connected with the rod $b^5$, and its upper arm extended above the bar $a'$ and curved over the short arm of the hand-lever hereinafter described.

$d d$ are the grain-boxes, and $d' d'$ the fertilizer-boxes, supported on the frame A in advance of the axle $b$, and arranged with the two grain-boxes in front and the two fertilizers in rear, as shown.

$d^2 d^2$ are openings in the bottom of the boxes.

$e$ is a grain-slide placed under boxes $d d'$, and provided with openings corresponding to openings $d^2$. This slide is given a reciprocating motion, so that the grain and fertilizer are received in the holes in the slide and carried to and delivered into the spouts by which they are planted.

$f$ represents a grain-spout arranged to receive the grain from the grain-slide and deliver it into the furrow which is opened by the shovel $f'$, which is secured on the lower front end of the spout.

$f^2$ is a fertilizer-spout having its upper end arranged to receive the fertilizer from the slide $e$, and its lower end is connected with and opens into the spout $f$, near the lower end of the latter, as shown, and the fertilizer and the grain are thus delivered together into the ground.

$g$ is a bar pivoted to an arch, $g'$, mounted on the rear of the fertilizer-box $d'$, and so that its lower end may swing at right angles to the direction of draft of the machine.

$g^2 g^2$ are anti-friction rollers journaled on pins extended rearward from the bar $g$. These rollers are arranged to bear on the opposite faces of the cam-wheel hereinafter described. The lower end of bar $g$ is connected with the grain-slide $e$ by the rod $e'$.

$h$ is a cam-wheel fixed on the axle $b$, and made in sections bent alternately to the right and left, so that it will give reciprocating motion to the slide $g$, between the rollers $g^2$ of which it runs, and, through the connecting-rod $e'$, move the slide-valve $e$ and drop the grain and fertilizer. This wheel, it will be seen, only revolves when the clutch mechanism is in the position shown in the drawings.

$i i$ are rods pivoted to the front bars, $a$, and extended and pivoted to the front of the spout $f$, bracing said spout, as shown.

$i' i'$ are drag-bars pivoted to the bar $i$, slightly in front of the spout $f$, and extended back, one on either side of the spouts, to the rear of the said spouts, and provided with shovels $i^2$, which run on either side of the furrow formed by shovel $f'$, and cover the ground into the said furrow after the grain and fertilizer have been deposited.

$j^3$ is a rod connecting the drag-bars $i^2$ behind the spout $f^2$.

$j$ is a shaft journaled on lugs $j'$, extended from the back bar, $a'$.

$j^2$ is an arm extended forward from shaft $j$, and connected with the spout $f^2$ by rod $j^3$, and it is connected with the drag-bars $i'$ by a rod, $j^4$, extended from rod $j^3$, as shown.

$k$ is a lever fixed to the shaft $j$, and having an arm, $k'$, extended forward under the curved arm of the lever $c$. This arm is connected with the spouts and drag-bars by rods $j^3$ $j^4$, as is the arm $j^2$.

$l$ represents the seat-bar, mounted on bar $a^4$, and supporting the driver's seat $l'$.

$m$ represents a handle-bar extended on opposite sides of and made fast to the clutch $b^4$, whereby the slides may be set to start correctly on commencing a row.

In the operation of my invention it will be seen that the driver, by a single motion of the lever $k$, raises the drag-bars and spouts, with their shovels, clear of the ground. The curved arm of the lever $c$ is engaged by the arm $k'$ of the lever, and the clutch is disengaged and the dropping ceases. The lever $k$ can be held in any suitable position desired by an ordinary pawl, which may be operated by the mechanism shown in Fig. 1.

Having thus described my invention, what I claim, and desire to secure by Letters Patent, is—

In a seeding-machine, the combination, with the clutch $b^4$, sliding on the axle $b$, frame A, the adjustable dropping-spouts, and the cultivator-beams having shovels arranged in rear of the dropping-spouts, of the connecting-rod $b^5$, the lever $c$, pivoted on the frame, and having its lower end connected to rod $b^5$ and its upper end bent laterally, the horizontal shaft $j$, journaled on the frame, and provided with arms $j^2$ $k'$, and the branched connecting-rods $j^3$ $j^4$, having their upper ends connected to the arms $k'$ $j^2$, and their lower ends made fast to the dropping-spouts and to the cultivator-beams, and the lever $k$, fixed to the shaft $j$, and bearing upon the upper laterally-turned end of lever $c$, whereby the dropping-spouts, cultivator-beams, and clutch may be simultaneously actuated by the single lever $k$, as set forth.

In testimony whereof I affix my signature in presence of two witnesses.

GEORGE H. SALTSMAN.

Witnesses:
RALPH THOMPSON,
JAMES G. MOORE.